(12) United States Patent
Cheney et al.

(10) Patent No.: US 11,712,115 B2
(45) Date of Patent: Aug. 1, 2023

(54) BRACKET FOR MOUNTING A TABLET SHAPED DEVICE

(71) Applicant: STM MANAGEMENT PTY LTD, Alexandria (AU)

(72) Inventors: Craig Cheney, Lindon, UT (US); Jacob Goodridge, Kelvin Grove (AU); Ethan Nyholm, North Bondi (AU)

(73) Assignee: STM MANAGEMENT PTY LTD, Alexandria (AU)

( * ) Notice: Subject to any disclaimer, the term of this patent is extended or adjusted under 35 U.S.C. 154(b) by 0 days.

(21) Appl. No.: 17/332,739

(22) Filed: May 27, 2021

(65) Prior Publication Data
US 2022/0378205 A1    Dec. 1, 2022

(30) Foreign Application Priority Data
May 27, 2021 (AU) ................................. 2021102895

(51) Int. Cl.
| | |
|---|---|
| *F16B 47/00* | (2006.01) |
| *A47B 97/00* | (2006.01) |
| *F16B 1/00* | (2006.01) |
| *F16M 13/02* | (2006.01) |
| *G06F 1/16* | (2006.01) |

(52) U.S. Cl.
CPC .............. *A47B 97/00* (2013.01); *F16B 1/00* (2013.01); *F16B 47/006* (2013.01); *F16M 13/022* (2013.01); *G06F 1/1681* (2013.01); *A47B 2097/005* (2013.01); *A47B 2097/006* (2013.01); *F16B 2001/0035* (2013.01)

(58) Field of Classification Search
None
See application file for complete search history.

(56) References Cited

U.S. PATENT DOCUMENTS

| | | | |
|---|---|---|---|
| 9,961,306 B1* | 5/2018 | Lev | H04B 1/3822 |
| 10,703,297 B1* | 7/2020 | Cohen | B60N 3/103 |
| 2015/0369418 A1* | 12/2015 | Wong | F16M 13/00 |
| | | | 248/309.3 |
| 2016/0173667 A1* | 6/2016 | Torres Gutierrez | H02J 7/0044 |
| | | | 455/575.1 |
| 2017/0328517 A1* | 11/2017 | Wessels | F16M 13/00 |
| 2019/0195417 A1* | 6/2019 | Kwasniewski | F16M 11/2064 |
| 2020/0063911 A1* | 2/2020 | Xiang | F16M 11/126 |
| 2022/0329113 A1* | 10/2022 | Bober | A47F 5/08 |

FOREIGN PATENT DOCUMENTS

JP        6664735 B1 *   3/2020   ............. A45C 11/00

* cited by examiner

*Primary Examiner* — Terrell L McKinnon
*Assistant Examiner* — Jerry Olivier
(74) *Attorney, Agent, or Firm* — Christensen, Fonder, Dardi & Herbert PLLC

(57) ABSTRACT

Disclosed herein is a bracket for mounting a tablet shaped device.

16 Claims, 9 Drawing Sheets

BRACKET FOR MOUNTING A TABLET SHAPED DEVICE

CROSS-REFERENCE TO RELATED APPLICATION

This application claims priority to Australian Patent Application 2021102895, filed May 27, 2021, which is hereby incorporated by reference in its entirety.

TECHNICAL FIELD

The disclosure herein generally relates to a bracket for mounting a tablet shaped device.

BACKGROUND

Many people use tablet shaped devices in the form of a smart phone or tablet computer, for example. Examples of smart phones include but are not limited to the SAMSUNG GALAXY™ and the APPLE IPHONE™. Examples of tablet computers include but are not limited to the APPLE IPAD™ and SAMSUNG GALAXY TAB™.

Tablet shaped devices are generally configured to be held in a user's hand during use. It is not always convenient, however, for a user to hold a tablet shaped device during use. For example, during a long video conference on the tablet shaped device, a user's hand and arm may become tired from holding the tablet shaped device. The angle of the tablet shaped device's camera may be poor during handheld use.

Workers may be situated in front of a computer and use their tablet shaped device throughout the day. This is becoming more common in view of the increasing usefulness of tablet shaped devices to users and the alternative and/or additional features that tablet shaped devices may provide. It is inconvenient, however, for a worker to pick up and put down their tablet shape device many times in a day, and to use their table shaped device while charging.

It may be desirable to prevent a user's hand from becoming tied, and provide a more ergonomic solution to tablet shaped device use. It may be desirable to assist workers to use the tablet shaped device throughout the day.

SUMMARY

Disclosed herein is a bracket for mounting a tablet shaped device. The bracket comprises a first arm for mounting the tablet shaped device thereto. The bracket comprises a second arm for mounting to a supporting structure. The first arm and the second arm are pivotally attached.

An embodiment comprises a hinge pivotally coupling the first arm and the second arm.

In an embodiment, the first arm is pivotable around a hinge axis laterally orientated with respect to the first arm.

In an embodiment, the firm arm is pivotable around a hinge axis that is longitudinally orientated with respect to the first arm.

In an embodiment, the first arm is pivotable around a hinge axis laterally orientated with respect to the first arm and pivotable around another hinge axis longitudinally orientated with respect to the first arm.

In an embodiment, wherein the first arm is pivotal 180° around the other hinge axis.

In an embodiment, the hinge comprises a torque hinge.

In an embodiment, the first arm is configured for magnetic attachment of the tablet shaped device thereto.

In an embodiment, the first arm is configured for receiving a wireless charger.

An embodiment comprises a wireless charger receiving socket.

An embodiment comprises a wall at the periphery of the wireless charger receiving socket, the wall defining at least one wireless charger cable passageway.

An embodiment comprises another wall at the bottom of the wireless charger receiving socket, wherein the other wall defines a finger receiving through hole for removal of the wireless charger from the wireless charger receiving socket.

In an embodiment, the second arm comprises a suction cup assembly for attachment to the supporting structure.

In an embodiment, the suction cup assembly comprises a suction cup and a suction cup actuator for actuating the suction cup.

In an embodiment, the suction cup actuator comprises a user operable rotary suction cup actuator.

In an embodiment, the suction cup assembly is rotationally mounted.

In an embodiment, the second arm comprises a releasable rotation stop engageable with the suction cup assembly to rotationally fix the suction cup assembly with respect to a second arm body.

In an embodiment, the releasable rotation stop comprises a pivotally mounted lever comprising a rotation stop end configured to engage the suction cup assembly.

In an embodiment, the rotation stop end is biased towards the suction cup assembly.

In an embodiment, the pivotally mounted lever comprises an actuatable end operationally coupled to a user control.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
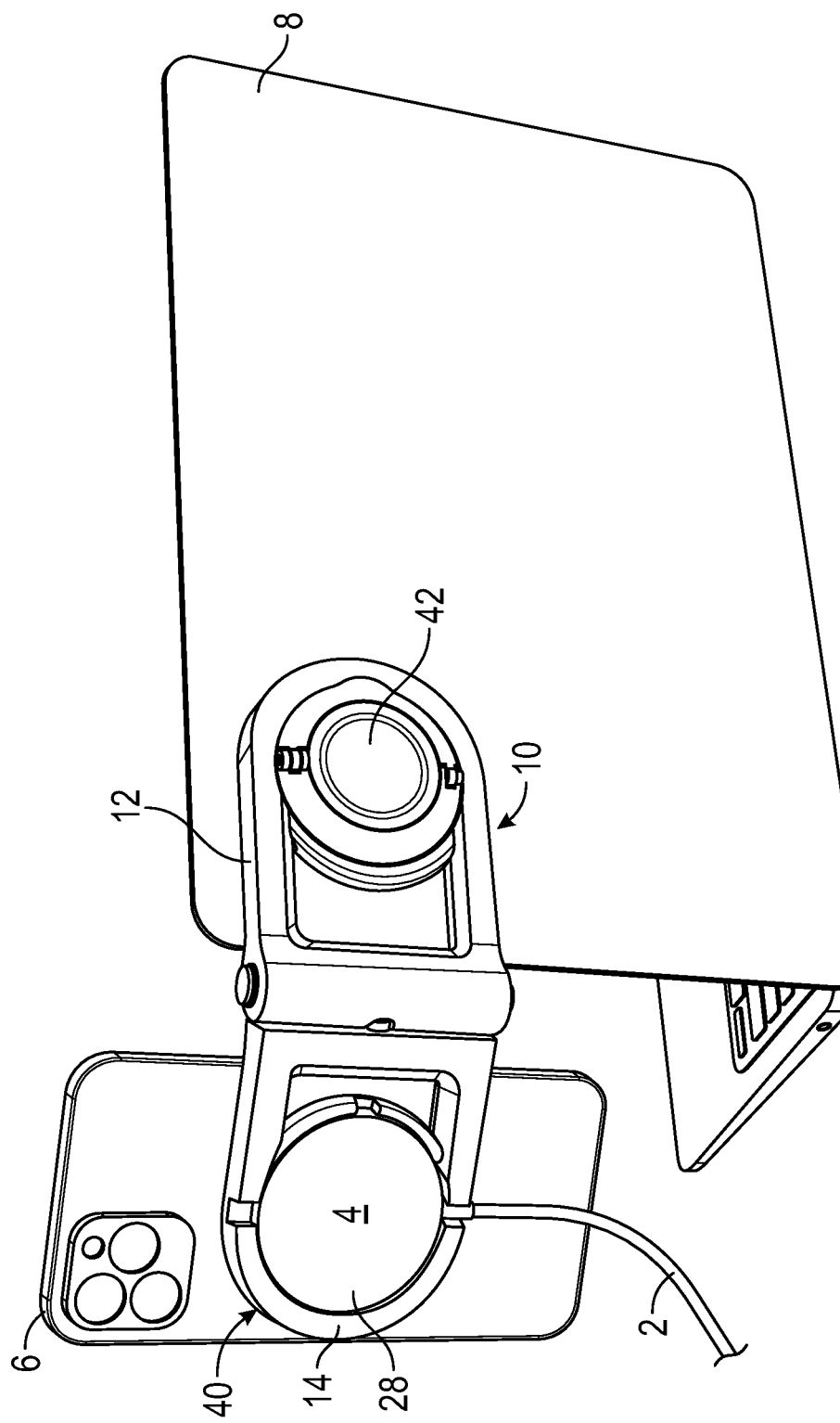
FIG. 1 shows a rear isometric view of an embodiment of a bracket for mounting a tablet shaped device.

FIG. 1 shows a rear isometric view of an embodiment of a bracket for mounting a tablet shaped device, the bracket being generally indicated by the numeral 10. Also shown in FIG. 1 is a supporting structure in the form of the electronic display of a laptop computer 8. An arm 12 of the bracket 10 is mounted to the rear face of the electronic display of the laptop computer 8. The bracket 10 comprises another arm 14. Mounted to one face 24 (FIG. 4) of the other arm 14 is a tablet shaped device 6 in the form of an Apple iPhone 12 Pro, however generally any suitable tablet shaped device may be used, examples which include but are not limited to a tablet computer, a smart phone, and a personal digital assistant. Mounted to another face 26 (FIG. 4) of the other arm 14 is a power transmitter 4 of a tablet shape device wireless charger in the form of an Apple MagSafe charger. The electronic display of the tablet shaped device 6 can be viewed while it is charging.

Figure 2:
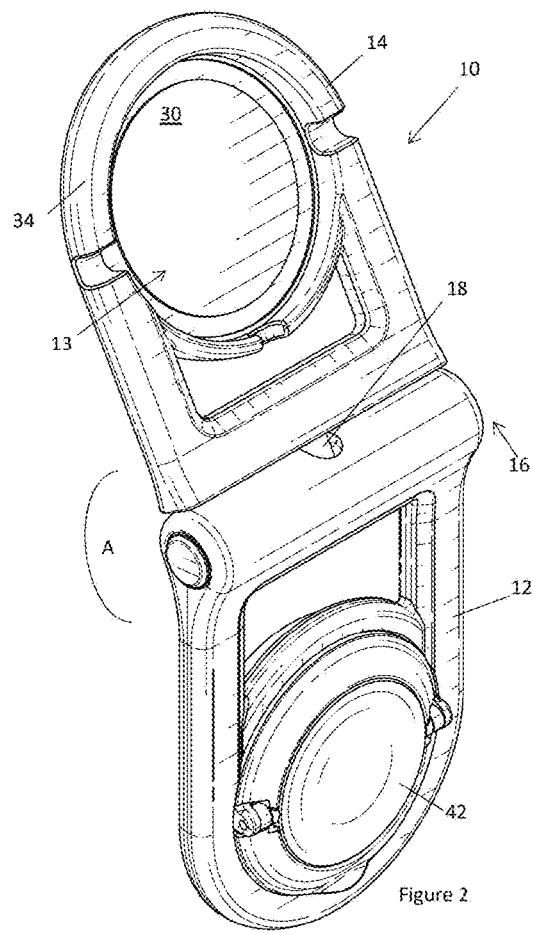
FIGS. 2 and 3 show front isometric views of the bracket of FIG. 1.
Figure 3:
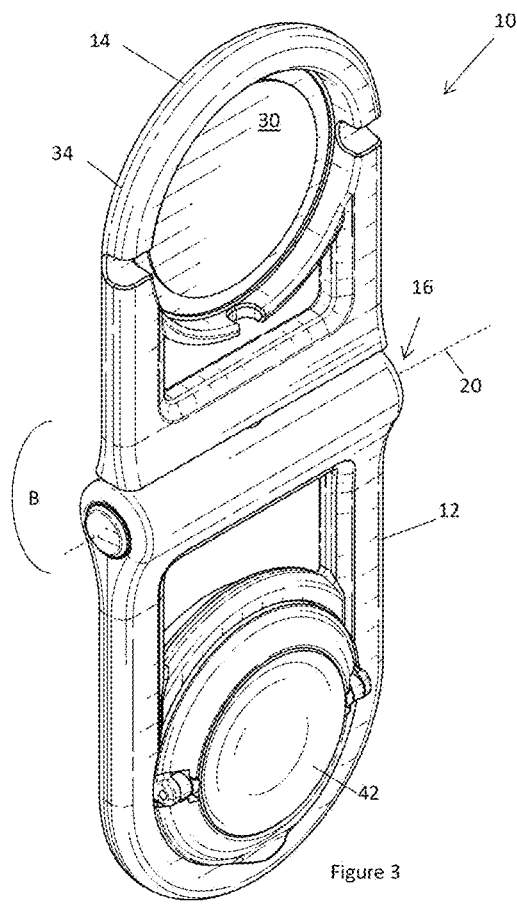
Figure 4:
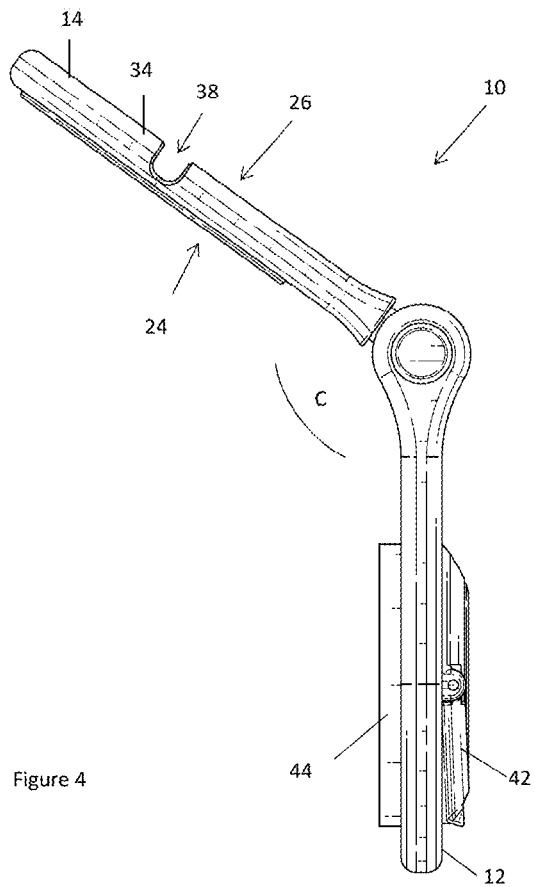
FIG. 4 shows a side elevation view of the bracket of FIG. 1.
Figure 5:
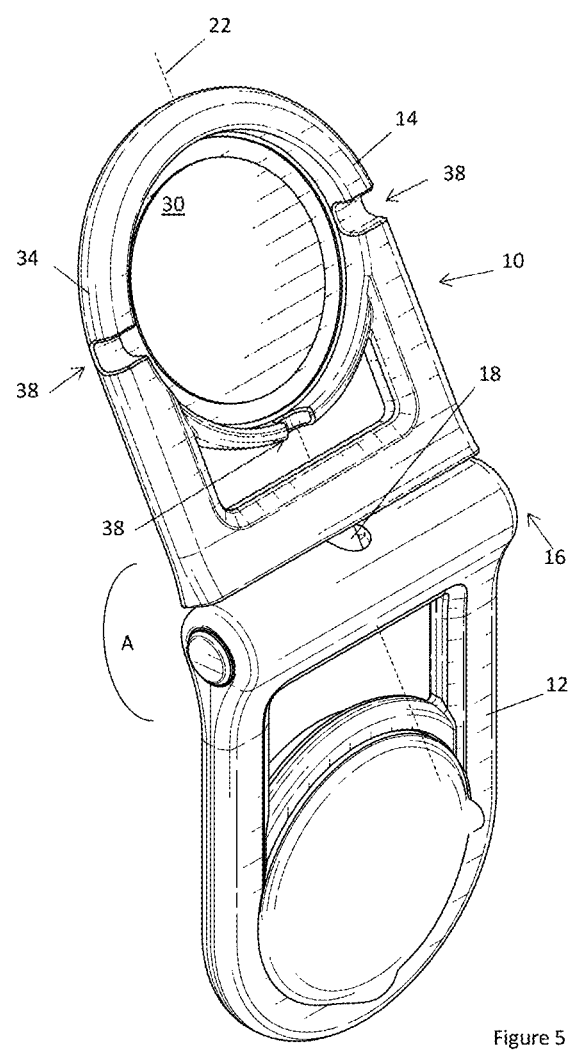
FIG. 5 is a detail from FIG. 1.

FIGS. 2 and 3 show front isometric views of the bracket 10, and FIG. 4 shows a side elevation view of the bracket 10, with the arms 12, 14 meeting at vertex 16 to form an angle A (approximately 25 degrees) in FIG. 2, a different angle B in FIG. 3 (approximately 180 degrees), and angle C (approximately 120 degrees) in FIG. 4. The arm 12 and the other arm 14 are pivotally attached by a hinge 18 that pivotally couples the arm 12 and the other arm 14. The angle at the vertex 16 can be changed by pivoting either arm 12, 14 with respect to the other arm 14, 12. The hinge 18 is pivotable around a hinge axis 20 (FIG. 3) laterally orientated with respect to the other arm 14 and perpendicular to a normal to faces 24, 26. FIG. 5 is a detail from FIG. 1, and shows another hinge axis 22 that is longitudinally orientated with respect to the arm 14 and perpendicular to the normal of faces 24, 26. The other arm 14 is pivotable around the other hinge axis 22 so it can be flipped around to present either face to the user. The phone can also be alternatively magnetically attached to the wireless transmitter 4 via internal magnets, which is useful if the spacing between the tablet shaped device and wireless transmitter needs to be reduced to enable charging, for example if the tablet shaped device is already in a protective case. The other arm 14 is pivotable 180° around the other hinge axis 22.

The hinge 18 is a plural axes hinge in the form of a dual axes hinge that provides pivoting around the two hinge axes 20, 22. Consequently, either one of the opposite faces 24, 26 (FIG. 4) of the other arm 14 can be presented to the user when the arm 12 is mounted to the supporting structure 8. The hinge 18 is in the form of a torque hinge (also known as a friction hinge or free stop). The arm 12 and the other arm 14 can be relatively arranged and the torque hinge will hold the relative arrangement.

The other arm 14 is configured to receive the power transmitter 4—which has a disk configuration—of the wireless charger. An electrical cable 2 is in electrical communication with the power transmitter 4 of the wireless charger. The other arm has a socket 30 at a rounded end in which the power transmitter 4 of the wireless charger can be received, as shown in FIG. 1. The wireless charger receiving socket 30 is complementarily configured to the wireless charger 28, defining a circular opening for the power transmitter 4, and which is substantially the same diameter as the body of the wireless transmitter 4. At the periphery of the wireless charger receiving socket 30 is a wall 34 in the form of a peripheral outer wall. The wall 34 is interrupted and defines at least one wireless charger cable passageway 38, in this embodiment three wireless charger cable passageways 38 angularly spaced 90 degrees apart, two of which are laterally located. Each passageway 38 allows the cable 6 to pass from an exterior into the socket 30. The cable to can pass through whichever wireless charger cable passageway 36 that a user prefers or is best for a given orientation and arrangement of the bracket 10.

The arm 14 comprises ferromagnetic material that is magnetically attracted to the tablet shaped device. The iPhone 12, for example, comprises a magnetic assembly at a back face thereof and is magnetically attachable to the arm 14. The ferromagnetic material comprises at least one magnet in the form of a rare earth or albino magnet, but may alternatively comprise a non-magnetic ferromagnetic material, for example steel.

Figure 6:
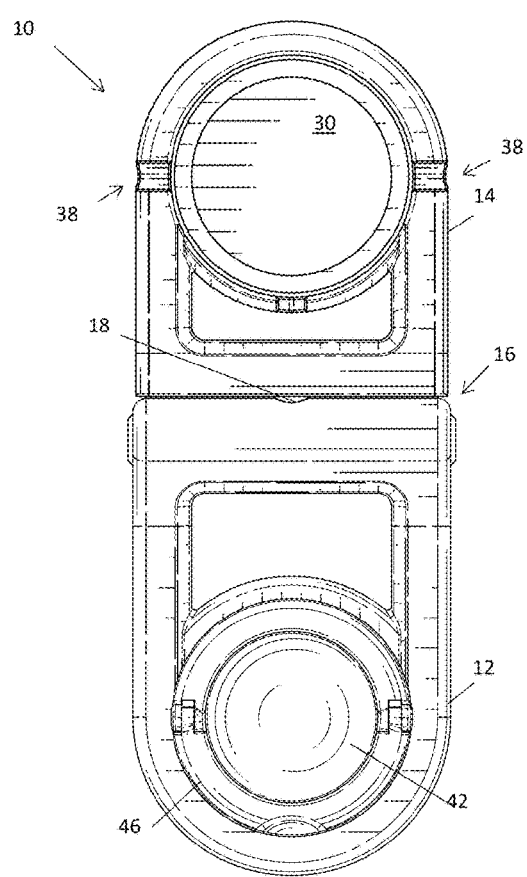
FIGS. 6 and 7 correspond to FIG. 3, and are elevational rear and front views of the bracket of FIG. 1.
Figure 7:
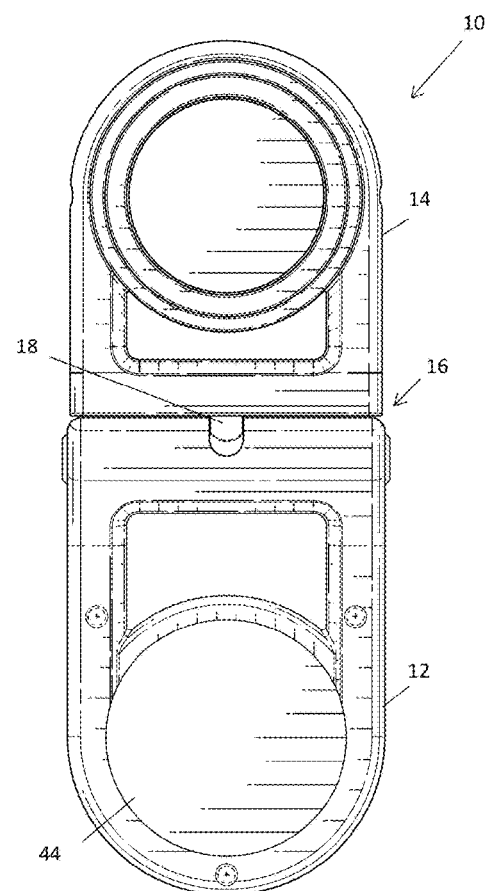

FIGS. 6 and 7 correspond to FIG. 3, and are elevational rear and front views of the bracket 10, with the arms 12, 14 making an angle of 180 degrees at vertex 16. The arm 12 comprises a suction cup assembly 42 for attachment to the supporting structure. The suction cup assembly 42 comprises a suction cup 44 visible in FIGS. 4 and 7, for example. The suction cup assembly 42 comprises a suction cup actuator 46 in the form of a user operable suction cup rotary actuator for actuating the suction cup 44. Operation of the suction cup assembly 42 will be described further below with reference to another embodiment of a bracket.

Figure 8:
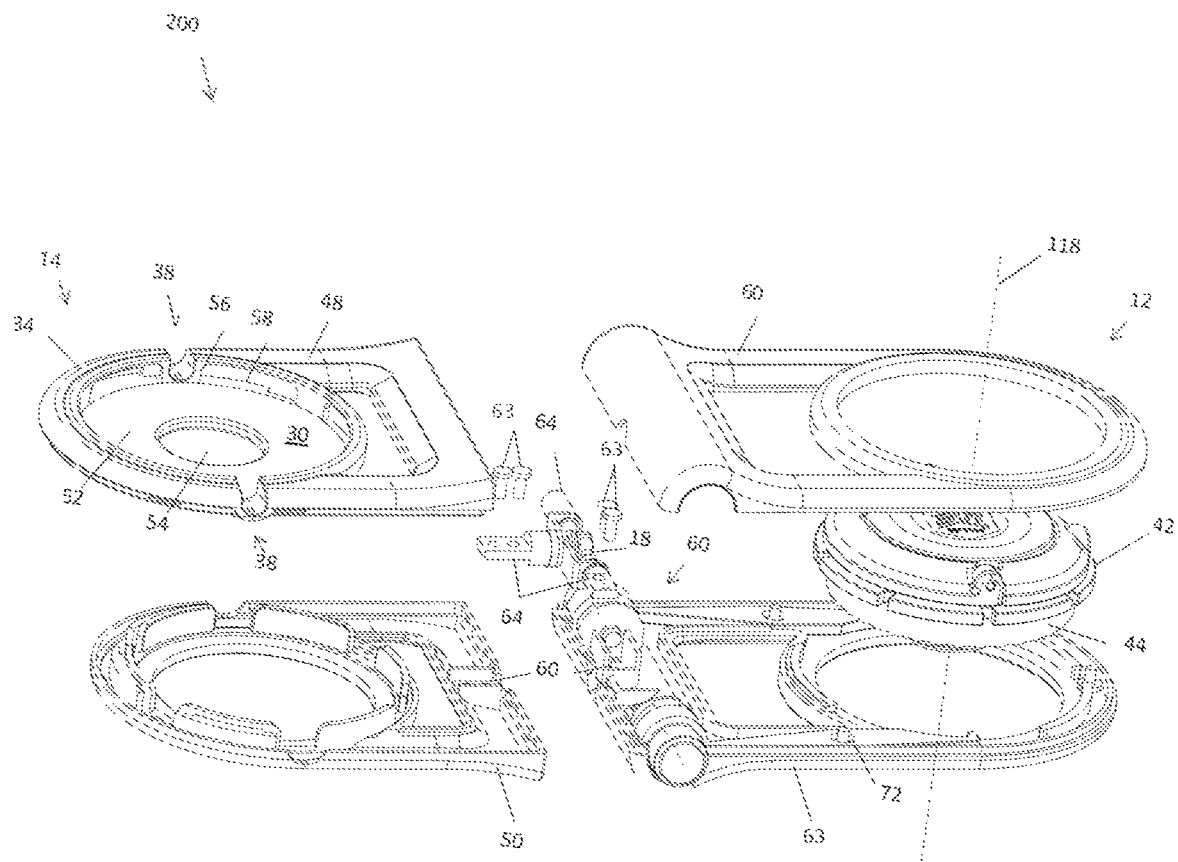
FIG. 8 shows and exploded isometric view of another embodiment of a bracket.

FIG. 8 shows an exploded isometric view of another embodiment of a bracket, where parts similar or identical in form and/or function are similarly numbered. Other arm 14 comprises a rear other arm portion 48 and a front other arm portion 50, which are cooperatively configured to attach—in this embodiment clip together—to form the other arm 14. The rear other arm portion 48 has only two wireless charger cable passage ways 36 into wireless charger receiving socket 30. The wireless charger cable passage ways 36 are angularly spaced 180° apart and laterally located on the opposite lateral sides of the other arm 14. Another wall 52 at the bottom of the wireless charger socket 30 defines a finger receiving through hole 54 for removal of the wireless charger from the wireless charger receiving socket. The wireless charger 4 can be pressed with a finger inserted through the through hole 54 to press the wireless charger out of the wireless charger socket 30. The interior surface 56 of wall 34 comprises a plurality of wireless charger gripping element 58 comprising a resilient material in the form of a thermoplastic elastomer (TPE), specifically in this but not all embodiments a thermoplastic polyurethane (TPU) 58 however generally TPS or generally any suitable form of TPE may be used. In this particular but not necessarily all embodiments, the plurality of gripping elements 58. The wireless charger gripping elements 58 compress when the wireless charger 8 is received by the cavity 30 and due to their resiliency hold the wireless transmitter 4 within the cavity 30.

Figure 9:
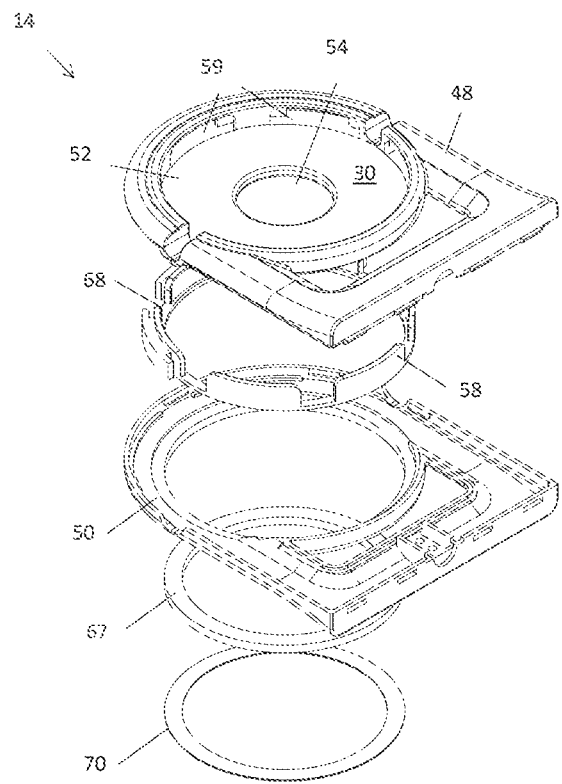
FIGS. 9 and 10 show rear and front exploded isometric views of the other arm of the bracket of FIG. 8.
Figure 10:
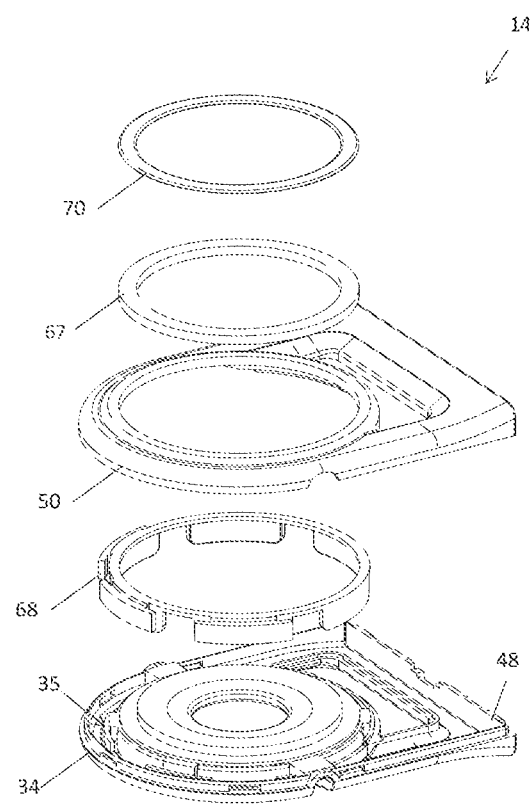

FIGS. 9 and 10 show rear and front exploded isometric views of the other arm 14, which reveal an adhesive fastened magnetic array 67 in the form of a ring comprising a plurality of 2.6 mm thick rare earth magnets in the form of neodymium magnets, an adhesive fastened thermoplastic elastomer (TPE) ring 70, and a gripping ring 68 having the gripping elements 58 integral therewith or alternatively/additionally attached thereto. Gripping ring 68 is received within a cavity 35 defined by wall 34 (FIG. 10) with gripping elements 58 inserted within gripping element receiving apertures 69 (FIG. 9) defined by the rear other arm portion 48 to protrude into wireless charger receiving socket 30.

Figure 11:
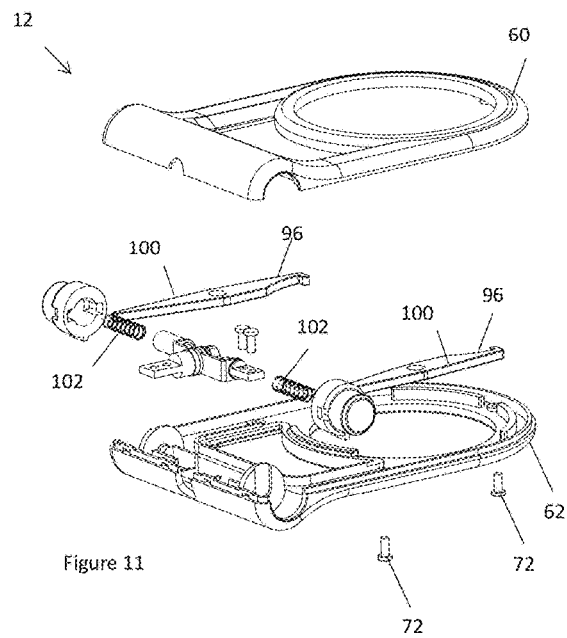
FIGS. 11 and 12 show rear exploded isometric views of an arm of the bracket of FIG. 8, less a suction cup assembly.
Figure 12:
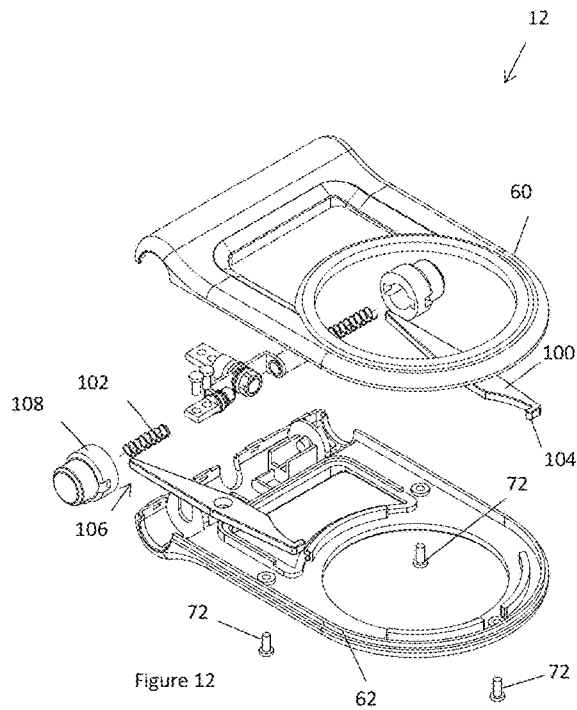

FIGS. 11 and 12 show rear exploded isometric views of arm 12, less the suction cup assembly 42. Arm 12 comprises rear arm portion 60 and front arm portion 62, which are cooperatively configured to mate and be fastened together. As seen in FIG. 8, housed within hinge cavity 60 defined by arm 12 is dual axes torque hinge 18, which is attached to arms 12,14 by fasteners 63 in the form of screws. Torque hinge 18 has three arms 64 that form a "T" and that are received within longitudinal and lateral cavities 66 defined by the front portions 50, 62.

Figure 13:
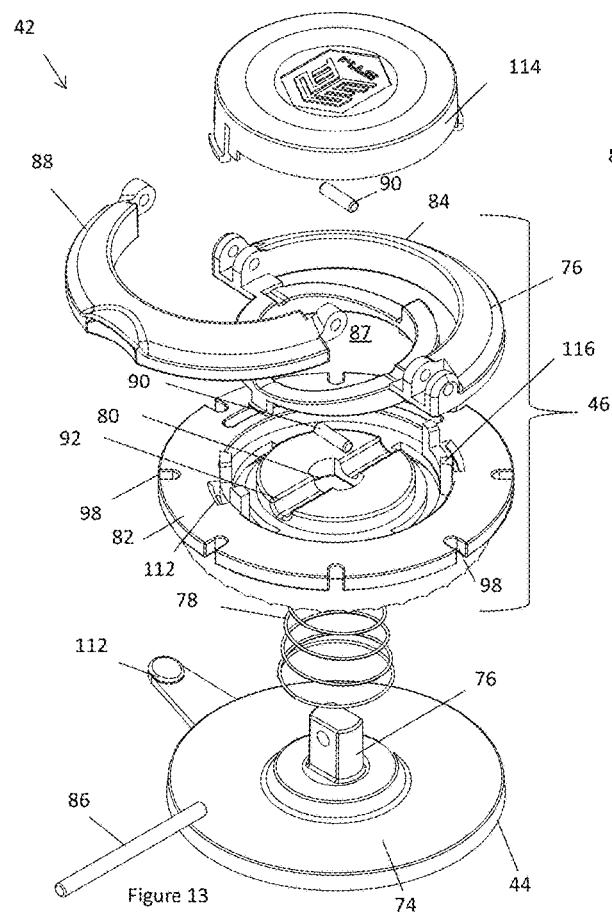
FIG. 13 shows an exploded isometric view of the suction cup assembly of the bracket of FIG. 8.
Figure 14:
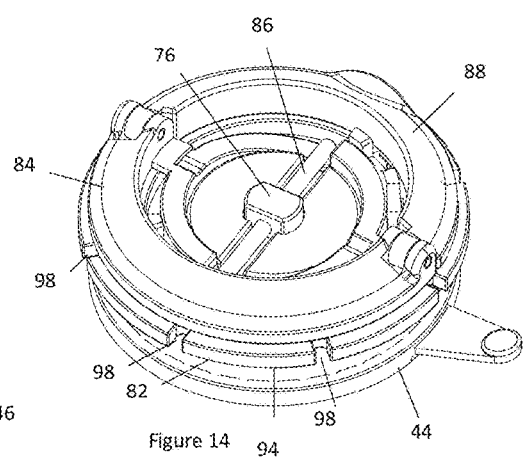
FIG. 14 shows an isometric view of some of the suction cup assembly of FIG. 13.
Figure 15:
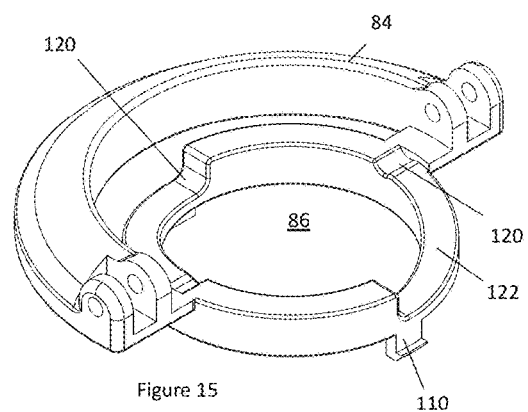
FIG. 15 shows an isometric view of a helical ramp member of the suction cup assembly of FIG. 13.
Figure 16:
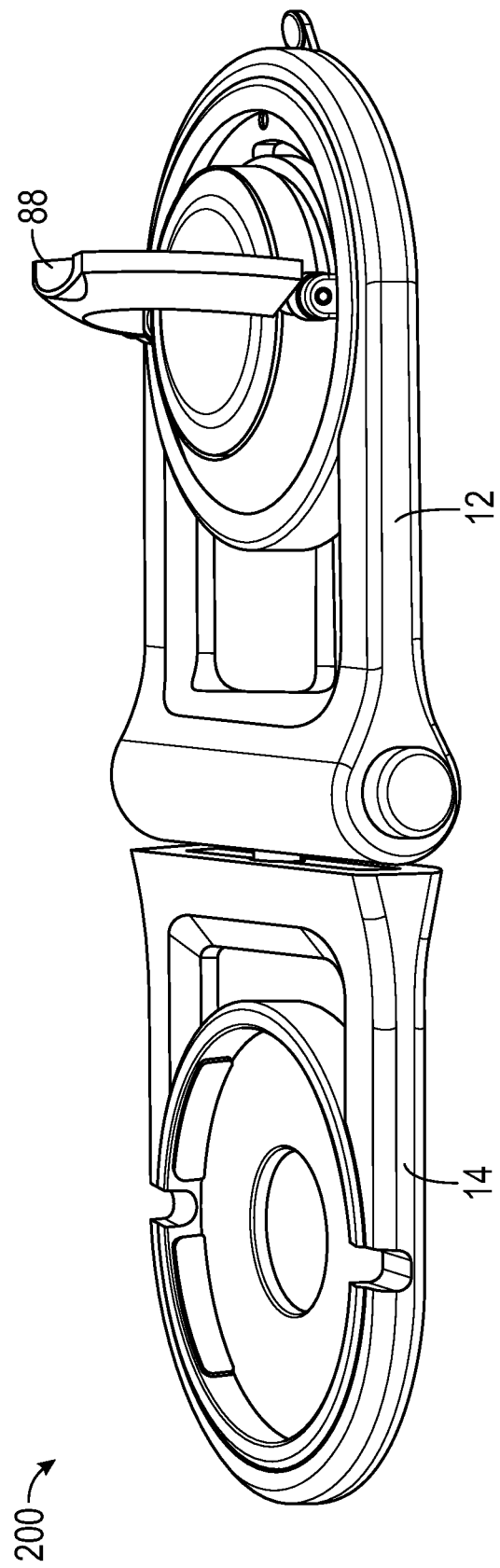
FIG. 16 shows the bracket of FIG. 8 with a handle in an operational position.

As seen in FIG. 8, the arm 12 comprises a suction cup assembly 42 for attachment to the supporting structure 8. The suction cup assembly 42 is rotationally mounted. The suction cup assembly 42 comprises a suction cup 44. FIG. 13 shows an exploded isometric view of the suction cup assembly 42, FIG. 14 shows an isometric view of some of the suction cup assembly in an assembled state, and FIG. 15 shows an isometric view of a helical ramp member of the suction cup assembly. The suction cup assembly 42 comprises a suction cup actuator 46 in the form of a user operable suction cup rotary actuator 46. The user operable suction cup rotary actuator 46 is operationally coupled to the suction cup 44. Attached to the centre of inwardly facing face 74 of the suction cup 44 is boss 76, which is disposed within suction cup outwardly biasing element 78 in the form of an extension spring 78. Boss 76 is inserted through boss aperture 80 defined by rotary bearing member 82 which bearingly receives helical ramp member 84. Boss 76 also passes through another boss aperture 87 defined by helical ramp member 84. A cam follower in the form of a pin 86 is transversely disposed through boss 76. The helical ramp member 84 and the rotary bearing member 82 are intermediate the pin 86 and the suction cup 44. Pin 86 is received by a pin receiver in the form of a pin cradle 92 defined by the rotary bearing member 82. User control 88 in the form of a collapsible handle is attached to the helical ramp member 84 by pins 90 for rotary actuation of the helical ramp member. User control 88 is pivotable around pins 90 between collapsed (FIG. 2) and operational positions (FIG. 16). Clockwise rotary actuation of the helical member 84 moves a helical ramp or cam in contact with the pin 86 such that the pin is inwardly translated. Counterclockwise actuation of the helical member 84 allows biasing member 78 to outwardly translate the suction cup. The inward translation of the perimeter of the suction cup 44 is stopped by rim 94 of the rotary bearing member 82. Helical ramp member 84 comprises a cam follower bearing surface 122 that is followed by the cam follower 86. The cam follower bearing surface 122 defines a plurality of cam follower capture cavities 120 in the form of a plurality of grooves in which the cam follower 86 can be captured to lock the suction cup in the attachment or non-attachment configurations.

Helical ramp member 84 has tabs 110 configured to be clippingly received within apertures 112 for attachment of the helical ramp member 84 to the rotary bearing member 82. Forks 116 at the apertures 112 guide the tabs into engagement. Closure 114 similarly clips to helical ramp member 84.

By operating the suction cup rotary actuator 46, a user can retract the centre of the suction cup 44 to reduce the air pressure between the suction cup 44 and the supporting structure 8 to which the suction cup 44 is in contact with. Atmospheric pressure holds the suction cup 44 and consequently the bracket 10 to the supporting structure 8. The user can also operate the suction cup rotary actuator 46 to extend the suction cup 44 centre and so release the suction cup 44 from the supporting structure 8. Pull tab 112 allows the user to peel away the suction cup 44 from supporting structure 8.

As seen in FIGS. 11 and 12, for example, the arm 12 comprises at least one—in this embodiment two—releasable rotation stops 96 engageable with the suction cup assembly to rotationally fix the suction cup assembly 42 with respect to portions 60, 62 ("body). The suction cup assembly 42 defines a plurality of cavities 98 for receiving the releasable rotationally mounted rotation stops 96. The relative position of the rotation stops 96 and the cavities may be reversed in embodiments. Generally, any form of rotation locking may be used.

The releasable rotation stops 96 each comprise a pivotally mounted lever 100 mounted on pivot 72 and comprising a rotation stop end 104, which each comprise a tab, configured to engage the suction cup assembly 42.

The rotation stop ends are biased towards the suction cup assembly by biasing member 102 in the form of springs outwardly biasing the other end of the lever 100. The pivotally mounted lever 100 comprises an actuatable end 106 operationally coupled to a user control 108 in the form of a button also outwardly biased. The actuatable ends 106 are disposed in slots defined by user controls 108. User control 108 is depressible to pivot the levers 100 to pivotally disengage the rotation stops 96 from suction cup assembly 42, enabling the arm 14 to spin around the suction cup around suction cup rotation axis 118 (FIG. 8), which is perpendicular the attachment face of the suction cup. Once the arm 14 is in the desired position, the user controls 108 can be released to engage the rotation stops 96 with the suction cup assembly 42. Generally, the arm may be rotated between vertical and horizontal orientations to change the tablet shaped device between portrait and landscape orientations.

Now that impediments have been described, it will be appreciated that some impediments may have some of the following advantages:
- A tablet shaped device may be used while not held the user's hand.
- A tablet shaped device may be conveniently mounted and orientated (by using 3 degrees of rotational freedom) during a teleconference.
- The angle of the tablet shape device may be selected to improve user experience and camera angle, for example.
- A tablet shaped device may be more conveniently used by a worker in front of a computer.
- A user may experience less fatigue and better ergonomics when.

Variations and/or modifications may be made to the embodiments described without departing from the spirit or ambit of the invention. For example:
- The supporting structure may be a freestanding computer monitor, a wall, a door, a household appliance in the form of a refrigerator, or generally any suitable form of structure.
- The hinge may have only the lateral hinge axis, or only the longitudinal hinge axis.
- The hinge may not be a torque hinge, and may alternatively or additionally have releasable screw locks, for example.
- Embodiments may not be configured to mount a wireless charger.
- Embodiment may have 0, 1, 2, 3, or more wireless charger cable passageways.
- Generally, any suitable form of wireless charger may be used as desired, examples of which include but are not limited to a Yootech Magsafe charger, a Zdago Magsafe charger, and wireless chargers that may not be magnetically attachable and may be attached using, for example, adhesive or mechanical fasteners.

The suction cup may be actuated by a push actuator as an alternative to the rotary actuator, or the suction cup may be actuator-less.

The suction cup assembly may not be rotationally mounted.

Embodiments may accommodate differently shaped wireless charges, for example square charges.

The suction cup may have a shape other than circular, for example square or oval.

The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A bracket for mounting a tablet shaped device, the bracket comprising:
   a first arm having a front face for removably mounting the tablet shaped device thereto, and a rear face spaced apart from the front face and configured to removably mount a power transmitter of a wireless charger thereto; and
   a second arm for mounting to a supporting structure, wherein the first arm and the second arm are pivotally attached, the second arm comprising:
   a suction cup assembly for attachment to the supporting structure; and
   a releasable rotation stop engageable with the suction cup assembly to rotationally fix the suction cup assembly with respect to a second arm body, wherein the releasable rotation stop comprises a pivotally mounted lever comprising a rotation stop end configured to engage the suction cup assembly.

2. A bracket defined by claim 1 comprising a hinge pivotally coupling the first arm and the second arm.

3. A bracket defined by claim 2 wherein the rear face defines a power transmitter receiving socket defining a through hole encircled by a plurality of wireless charger gripping elements.

4. A bracket defined by claim 3 wherein the through hole is encircled by a plurality of magnets for magnetic attachment of the tablet shaped device.

5. A bracket defined by claim 2 wherein the first arm is pivotable around a hinge axis laterally orientated with respect to the first arm and pivotable around another hinge axis longitudinally orientated with respect to the first arm.

6. A bracket defined by claim 5 wherein the first arm is pivotal 180° around the other hinge axis.

7. A bracket defined by claim 2 wherein the hinge comprises a torque hinge.

8. A bracket defined by claim 1 wherein the first arm is configured for magnetic attachment of the tablet shaped device thereto.

9. A bracket defined by claim 1 comprising a wireless charger receiving socket.

10. A bracket defined by claim 9 comprising a wall at the periphery of the wireless charger receiving socket, the wall defining at least one wireless charger cable passageway.

11. A bracket defined by claim 9 comprising another wall at the bottom of the wireless charger receiving socket, wherein the other wall defines a finger receiving through hole for removal of the wireless charger from the wireless charger receiving socket.

12. A bracket defined by claim 1 wherein the suction cup assembly comprises a suction cup and a suction cup actuator for actuating the suction cup.

13. A bracket defined by claim 12 wherein the suction cup actuator comprises a user operable rotary suction cup actuator.

14. A bracket defined by claim 1 wherein the suction cup assembly is rotationally mounted.

15. A bracket defined by claim 1 wherein the rotation stop end is biased towards the suction cup assembly.

16. A bracket defined by claim 1 wherein the pivotally mounted lever comprises an actuatable end operationally coupled to a user control.

* * * * *